United States Patent [19]

Bavaveas

[11] 4,159,008

[45] Jun. 26, 1979

[54] ANIMAL LITTER

[75] Inventor: Tristan Bavaveas, Paris, France

[73] Assignee: Societe Anonyme dite: EPARCO, France

[21] Appl. No.: 813,233

[22] Filed: Jul. 6, 1977

[30] Foreign Application Priority Data

Jul. 6, 1976 [FR] France .................. 76 20587

[51] Int. Cl.² ........................... A01K 29/00
[52] U.S. Cl. ..................................... 119/1
[58] Field of Search .................. 119/1; 260/345.5

[56] References Cited

U.S. PATENT DOCUMENTS 3,286,691  11/1966  McFadden .................. 119/1
4,007,708  2/1977  Yacono ...................... 119/1

FOREIGN PATENT DOCUMENTS 1437186  5/1976  United Kingdom .............. 119/1

Primary Examiner—Russell R. Kinsey
Assistant Examiner—R. P. Swiatek
Attorney, Agent, or Firm—Robert E. Burns; Emmanuel J. Lobato; Bruce L. Adams

[57] ABSTRACT

An animal litter, in particular for cats, is in the form of granulated solid material having a large grain size. The material is expanded and has a specific weight value between 50 grams/liter and 200 grams/liter. In an example, the material is constituted by mica phlogophite in the form of flake treated exfoliation.

11 Claims, No Drawings

ANIMAL LITTER

FIELD OF INVENTION

The present invention relates to a product for providing litter for cats.

BACKGROUND OF THE INVENTION

Litter for cats must be made from a divided product able to be placed in a suitable container, which product is light, does not deteriorate, is aseptic, non-harmful (non-toxic, non-corrosive), easily absorbs urine, is able to retain unpleasant odours, is chemically inert with regard to animal urine or excrement or at the very least, is not able to produce dangerous chemical reactions. One product traditionally used hitherto is constituted by a calcined clay or large grain size, which has numerous disadvantages, such as that of forming dust when the cat scratches the litter to bury its excrement. The product is heavy and therefore difficult to handle when it is replaced. It has an inadequate absorbent capacity as regards water and ammonia from the excrement, which produces the unpleasant odours etc.

DESCRIPTION OF THE INVENTION

The present invention proposes to provide a product serving as litter for animals, in particular cats, obviating these drawbacks, constituted by an expanded material having a specific weight of between approximately 50 grams/liter and 200 grams/liter.

According to other features, the product has a maximum content of organic material of 2 to 4% of its dry weight at 110° C. It has an absorbent capacity as regards water of between 200% and 350% of its weight and as regards ammonia of between 30% and 35% of its weight.

This product is 2 to 3.5 times more absorbent as regards water and 1.3 to 1.5 times more absorbent as regards ammonia than the product used hitherto. This product's capacity to retain odours is more than 45% greater than that of the traditional product. The reduced content of organic materials gives it the advantage of lasting longer without deterioration and of having a long conservation capacity both as regards storage and use. This product therefore makes considerable progress with respect to the prior state of the art owing to the advantages which it incorporates.

The litter for animals, in particular cats, according to the invention, is in the form of a solid product of large grain size which can be spread out in a layer of varying thickness at the bottom of a container intended for the animal's use.

This product is of the expanded type, having a specific weight of between 50 grams/liter and 200 grams/liter preferably between 80 grams/liter and 150 grams/liter, therefore, on average five times lighter than the similar traditional product.

The organic material content of the product according to the invention is lower than that of conventional products and generally comprises between approximately 2 to 4% of the dry weight at 110° C. and preferably from 3 to 3.5%.

The mineral material content of the product according to the invention is approximately 90 to 93%.

By way of example, a product having the following composition has given good results: silica and insoluble materials from 37% to 42% of the dry weight at 110° C., preferably from 38% to 39%, magnesium as MgO from 24% to 27%, preferably from 25% to 26%, potassium as $K_2O$ from 9% to 11%, preferably from 9.5% to 10%, iron oxide $Fe_2O_3$ from 4% to 7%, preferably from 5.5% to 6%, calcium as $CaCO_3$ from 0.25% to 0.50%, preferably from 0.30% to 0.37% and aluminium as $Al_2O_3$ from 8.5% to 10%, preferably from 8.7% to 9.7%, elements such as Na, Cr, Mn, Co, Ni, Zn, as trace elements, from 200 to 3000 PPM, preferably from 500 to 2500 PPM.

The absorbent capacity of the product according to the invention as regards water comprises between 200 and 350% of its weight, whereas that of the similar traditional product is only 100% of its weight, therefore 2 to 3.5 times less.

The absorbent capacity of the product according to the invention with regard to ammonia is between 30% and 35% of its weight whereas that of a similar traditional product is only 23% of its weight, therefore 1.3 to 1.5 times less, hence a capacity to retain odours of the product according to the present invention more than 45% greater than that of the similar traditional product.

As a non-limiting example, the product according to the invention may be obtained by the exfoliation of flakes of mica phlogophite which has been subjected to a thermal treatment at a temperature of the order of 700° C. without the addition of foreign bodies making it possible to increase its specific volume to a considerable extent (20 to 30 times).

It is quite clear that the product forming litter according to the present invention may have numerous variations depending on the composition, grain size, the colour obtained due to the addition of colouring agents or other secondary properties obtained by physical treatment or the addition of secondary products in small quantities. These variations would in no way alter the inventive spirit of this invention.

What is claimed is:

1. A product for animal litter in the form of granulated solid material having a large grain size, characterised by the fact that it is constituted by an expanded material having a specific weight selected from the range of values consisting of between 50 grams/liter and 200 grams/liter and by the fact that the material is obtained by the exfoliation of mica phlogopite in the form of flakes treated by being subjected to a temperature of the order of 700° C. without the addition of foreign bodies to increase its specific volume 20 to 30 times, said material having an absorbent capacity with regard to water selected from the range of values consisting of between 200% and 350% of its weights and an absorbent capacity with regard to ammonia selected from the range of values consisting of between 30% and 35% of its weight.

2. A product for animal litter in the form of granulated solid material having a large grain size, characterised by the fact that it is constituted by an expanded material having a specific weight selected from the range of values consisting of between 50 grams/liter and 200 grams/liter and by the fact that it contains a weight of silica and insoluble material selected from the range of values consisting of between 37% to 42% by weight when dry, at 110° C.

3. A product for animal litter according to claim 2, characterised by the fact that it contains organic material with a content value selected from the range of values consisting of between 2 and 4% of the dry weight at a temperature of 110° C.

4. A product for animal litter according to claim 2, characterized by the fact that the value of its absorbent capacity with regard to water is selected from the range of values consisting of between 200% and 350% of its weight.

5. A product for animal litter according to claim 2, characterized by the fact that the value of its absorbent capacity with regard to ammonia is selected from the range of values consisting of between 30% and 35% of its weight.

6. A product for animal litter in the form of granulated solid material having a large grain size, characterised by the fact that it is constituted by an expanded material having a specific weight selected from the range of values consisting of between 50 grams/liter and 200 grams/liter and by the fact that it contains a weight of magnesium in the form of MgO selected from the range of values consisting of between 24% and 27% by weight when dry, at 110° C.

7. A product for animal litter in the form of granulated solid material having a large grain size, characterised by the fact that it is constituted by an expanded material having a specific weight selected from the range of values consisting of between 50 grams/liter and 200 grams/liter and by the fact that it contains a weight of potassium in the form of $K_2O$ selected from the range of values consisting of between 9% to 11% by weight when dry, at 110° C.

8. A product for animal litter in the form of granulated solid material having a large grain size, characterised by the fact that it is constituted by an expanded material having a specific weight selected from the range of values consisting of between 50 grams/liter and 200 grams/liter and by the fact that it contains a weight of iron oxide in the form of $Fe_2O_3$ selected from the range of values consisting of between 4% to 7% by weight when dry, at 110° C.

9. A product for animal litter in the form of granulated solid material having a large grain size, characterised by the fact that it is constituted by an expanded material having a specific weight selected from the range of values consisting of between 50 grams/liter and 200 grams/liter and by the fact that it contains a weight of calcium in the form of $CaCO_3$ selected from the range of values consisting of between 0.25% to 0.50% by weight when dry, at 110° C.

10. A product for animal litter in the form of granulated solid material having a large grain size, characterised by the fact that it is constituted by an expanded material having a specific weight selected from the range of values consisting of between 50 grams/liter and 200 grams/liter and by the fact that it contains a weight of mineral matter selected from the range of values consisting of between 90 to 93% by weight, when dry, at 110° C.

11. A product for animal litter in the form of granulated solid material having a large grain size, characterised by the fact that it is constituted by an expanded material having a specific weight selected from the range of values consisting of between 50 grams/liter and 200 grams/liter and by the fact that it contains a weight of aluminium in the form of $Al_2O_3$ selected from the range of values consisting of between 8.5% to 10% by weight when dry, at 110° C.

* * * * *